(12) United States Patent
Sakamoto et al.

(10) Patent No.: US 11,059,374 B2
(45) Date of Patent: Jul. 13, 2021

(54) HYBRID VEHICLE CONTROL APPARATUS AND HYBRID VEHICLE

(71) Applicant: HITACHI AUTOMOTIVE SYSTEMS, LTD., Hitachinaka (JP)

(72) Inventors: Hiroyuki Sakamoto, Tokyo (JP); Hideki Sekiguchi, Tokyo (JP); Yasuaki Sato, Tokyo (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 266 days.

(21) Appl. No.: 16/468,452

(22) PCT Filed: Jan. 29, 2018

(86) PCT No.: PCT/JP2018/002634
§ 371 (c)(1),
(2) Date: Jun. 11, 2019

(87) PCT Pub. No.: WO2018/155083
PCT Pub. Date: Aug. 30, 2018

(65) Prior Publication Data
US 2020/0189557 A1 Jun. 18, 2020

(30) Foreign Application Priority Data
Feb. 21, 2017 (JP) .............................. JP2017-029737

(51) Int. Cl.
*B60L 50/16* (2019.01)
*B60W 20/15* (2016.01)
(Continued)

(52) U.S. Cl.
CPC .............. *B60L 50/16* (2019.02); *B60L 58/13* (2019.02); *B60W 10/26* (2013.01); *B60W 20/15* (2016.01);
(Continued)

(58) Field of Classification Search
CPC ...... B60L 50/16; B60L 58/13; B60L 2240/54; B60W 20/15; B60W 10/26; B60W 20/40; B60W 2510/244
See application file for complete search history.

(56) References Cited

U.S. PATENT DOCUMENTS

| 2015/0243947 A1* | 8/2015 | Seto ........................ B60L 50/64 429/158 |
| 2015/0246591 A1 | 9/2015 | Ono |
| 2017/0144650 A1* | 5/2017 | Nagamiya .............. B60K 6/445 |

FOREIGN PATENT DOCUMENTS

| JP | 2006-094628 A | 4/2006 |
| JP | 2011-213275 A | 10/2011 |
| JP | 2015-166204 A | 9/2015 |

OTHER PUBLICATIONS

International Search Report with English translation and Written Opinion issued in corresponding application No. PCT/JP2018/002634 dated May 1, 2018.

* cited by examiner

*Primary Examiner* — Tyler J Lee
*Assistant Examiner* — Yufeng Zhang
(74) *Attorney, Agent, or Firm* — Foley & Lardner LLP

(57) ABSTRACT

The present invention is to make it possible to effectively recover regenerative energy and improve a fuel efficiency. Thus, there is provided an HCM 50 of a hybrid vehicle, in which the hybrid vehicle includes: an engine; a drive wheel to which a driving force of the engine is transmittable; a motor to which the driving force from the engine is transmittable and which is capable of transmitting a driving force to the drive wheel; and a battery which supplies power for driving the motor and stores power generated by the motor. The HCM 50 is configured to include: a high efficiency range information storage unit 53 that stores information (Continued)

specifying a high efficiency range in which an engine efficiency of the engine is high in an engine characteristic of the engine; a power generation amount measurement unit 51 that measures a low efficiency range power generation amount, which is an amount of power generated by the motor and stored in the battery when the engine operates in a low efficiency range being out of the high efficiency range; and an integrated control unit 52 that controls power of the low efficiency range power generation amount to be supplied from the battery to the motor when it is necessary to supply power for driving the motor.

10 Claims, 7 Drawing Sheets

(51) Int. Cl.
  *B60L 58/13* (2019.01)
  *B60W 10/26* (2006.01)
  *B60W 20/40* (2016.01)
(52) U.S. Cl.
  CPC .......... *B60W 20/40* (2013.01); *B60L 2240/54* (2013.01); *B60W 2510/244* (2013.01)

HYBRID VEHICLE CONTROL APPARATUS AND HYBRID VEHICLE

TECHNICAL FIELD

The present invention relates to a hybrid vehicle control apparatus or the like that includes an engine and a motor and is capable of generating, with the motor, electric power using a driving force from a drive wheel.

BACKGROUND ART

In a hybrid vehicle including an engine and a motor as drive sources, improvement in fuel efficiency or the like is achieved by switching between the engine and the motor to be used as the drive source in accordance with a situation.

For example, a technique of determining target value (a target state of charge (SOC)) of a power storage amount of a power storage device based on a power efficiency at the time of charge, charging the power storage device to the target SOC, and then, determining whether to continue travel using an electric motor by comparing an overall power running efficiency and a combustion efficiency of an engine (see, for example, PTL 1).

In addition, in the hybrid vehicle, there is known a technique of operating a motor as a power generator using a driving force of a drive wheel at the time of decelerating the vehicle to recover regenerative energy and improve a fuel efficiency.

CITATION LIST

Patent Literature

PTL 1: JP 2011-213275 A

SUMMARY OF INVENTION

Technical Problem

For example, when using the motor as the power generator recover the regenerative energy, only the amount of power corresponding to a free capacity of a battery can be recovered. Therefore, when an SOC of the battery is high, there is a risk that a situation where it is difficult to recover most of the regenerative energy may occur.

On the other hand, when the battery SOC is simply lowered so as to recover most of regenerative energy, there is a risk that the SOC may extremely decrease if it is difficult to recover the regenerative energy due to sudden braking or the like. In such a case, a situation where it is difficult to use a driving force of the motor when required or a case where the fuel efficiency decreases because fuel is unnecessarily used to obtain the required SOC.

The present invention has been made in view of the above circumstances, and an object thereof is to provide a technology capable of effectively recovering regenerative energy and improving fuel efficiency.

Solution to Problem

In order to achieve the above object, a hybrid vehicle control apparatus according to a first aspect includes: an engine; a drive wheel to which a driving force of the engine is transmittable; a motor which the driving force from the engine is transmittable and which is capable of transmitting a driving force to the drive wheel; and a battery which supplies power for driving the motor and stores power generated by the motor. The hybrid vehicle control apparatus includes: an efficiency range information storage unit that stores information specifying a first efficiency range in which an engine efficiency of the engine is relatively high in an engine characteristic of the engine; a power generation amount measurement unit that measures a second efficiency range power generation amount, which is an amount of power generated by the motor and stored in the battery when the engine operates in a second efficiency range being out of the first efficiency range; and a power control unit that controls power of the second efficiency range power generation amount to be supplied from the battery to the motor when it is necessary to supply power for driving the motor.

Advantageous Effects of Invention

According to the present invention, the recovered energy can be effectively recovered, and the fuel efficiency can be improved.

DESCRIPTION OF EMBODIMENTS

An embodiment will be described with reference to the drawings. Incidentally, the embodiment to be described hereinafter does not limit the invention according to the claims, and further, all of the elements described in the embodiment and combinations thereof are not necessarily indispensable for the solution of the invention.

Figure 1:
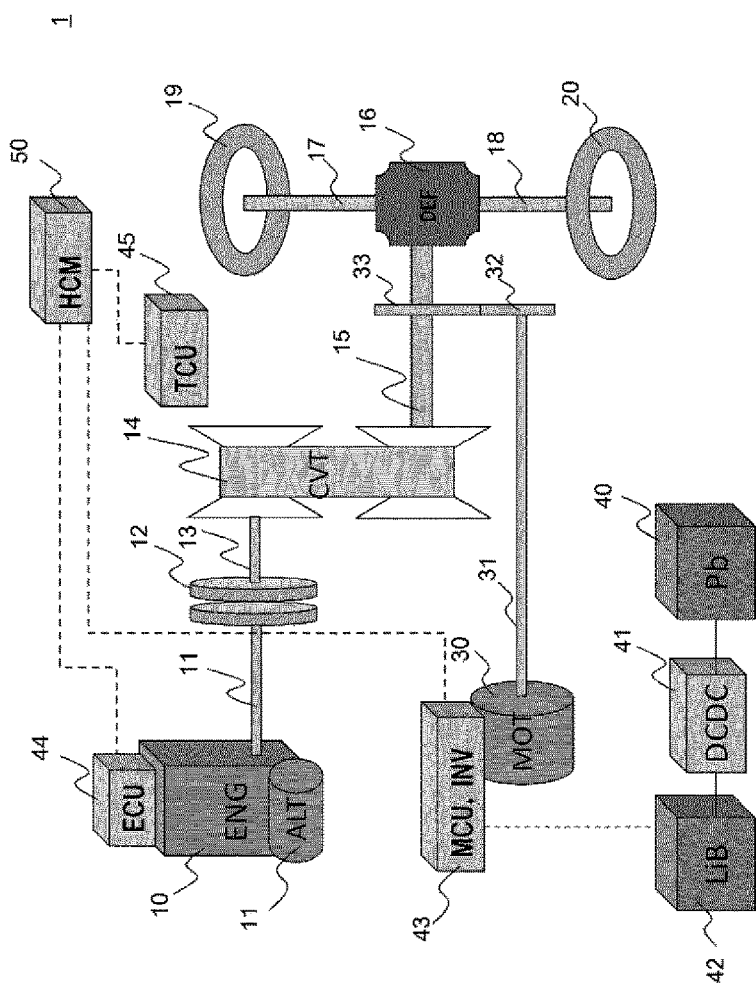
FIG. 1 is a configuration diagram of a part of a hybrid vehicle according to an embodiment.

FIG. 1 is a configuration diagram of a part of a hybrid vehicle according to an embodiment.

A hybrid vehicle 1 includes: an engine 10; a clutch 12; a transmission 14; a propeller shaft 15; a differential 16; drive shafts 17 and 18; drive wheels 19 and 20; a motor (MOT) 30; a lead storage battery (battery) 40; a DCDC converter 41; a lithium battery 42; a motor control unit (MCU) 43; an engine control unit (ECU) 44; a transmission control unit (TCU) 45; and a hybrid control module (HCM) 50 as an example of a control apparatus.

The MCU 43 controls an operation of the motor 30. The ECU 44 controls an operation of the engine 10. The TCU 45 controls an operation of the transmission 14. The HCM 50 is connected to the MCU 43, the ECU 44, the TCU 45, and the like, and controls the operations of the engine 10 and the motor 30 in an integrated manner. Various types of information are input to the HCM 50 directly from a sensor (not illustrated) or via another device (the MCU 43, the ECU 44, the TCU 45, or the like).

Examples of the information input to the HCM 50 include information such as rotational speed of the engine 10, an output torque of the engine 10 or an estimated value of the output torque (an estimated torque value), and an SOC of the battery 40. In the present embodiment, the estimated torque value is calculated, for example, by the ECU 44 based on the amount of fuel supplied to the engine 10 or the like, and the ECU 44 inputs the calculated result to the HCM. Incidentally, a torque sensor that measures a torque output from the engine 10 may be provided so as to use the torque as an input.

An output shaft 11 of the engine 10 is connected to an input side of the clutch 12. An output shaft 13 of the clutch 12 is connected to an input side of the transmission 14. The propeller shaft 15 is connected to an output side of the transmission 14. The propeller shaft 15 is connected to the drive wheels 19 and 20 via the differential 16 and the drive shafts 17 and 18. Incidentally, an alternator, which generates power by a driving force of the engine 10, is connected to the engine 10.

The clutch 12 transmits and interrupts the driving force between the engine 10 and the transmission 14.

In the present embodiment, the clutch 12 is configured such that the input side and an output side are connected when the motor 30 is caused to generate power by the driving force of the engine 10, and the input side and the output side are interrupted when the motor 30 is caused to generate power by a driving force of the drive wheels 19 and 20. The transmission 14 for example, a continuously variable transmission (CVT), and changes a transmission ratio between a shaft on an input side and a shaft on the output side. Incidentally, the transmission 14 may be an automatic transmission (AT).

An output shaft 31 of the motor 30 is connected to be capable of transmitting the driving force to the propeller shaft 15 via, for example, gears 32 and 33. With such a configuration, the driving force of the motor 30 can be transmitted to the drive wheels 19 and 20, the driving force of the drive wheels 19 and 20 can also be transmitted to the motor 30, and the driving force of the engine 10 can also be transmitted to the motor 30.

The motor 30 can operate not only as a drive source that rotates the output shaft 31 by supplied power but also as a generator that generates power by being rotated by the driving force from engine 10 or the drive wheels 19 and 20 supplied from output shaft 31.

The motor 30 is connected to the battery 40 via the DCDC converter 41, the lithium battery 42, and the MCU 43. The DCDC converter 41 converts a DC voltage. The lithium battery 42 stores power of a predetermined voltage. The MCU 43 includes an inverter therein, and supplies power from the lithium battery 42 to the motor 30 and supplies the power generated by the motor 30 to (charges) the lithium battery 42.

Next, the HCM 50 will be described in detail.

Figure 2:
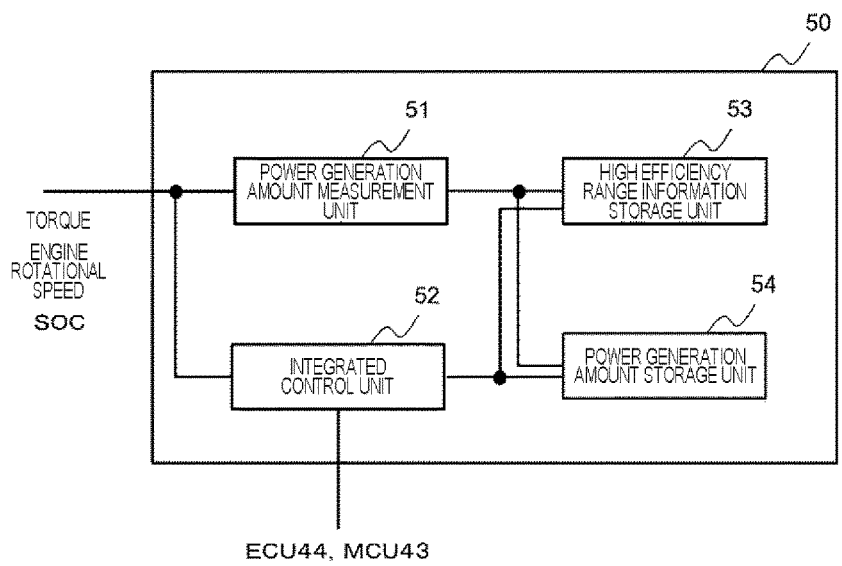
FIG. 2 is a functional configuration diagram of an HCM according to the embodiment.

FIG. 2 is a functional configuration diagram of the HCM according to the embodiment.

The HCM 50 is constituted by, for example, a central processing unit (CPU), a random access memory (RAM), a read-only memory (ROM), a communication interface (I/F), and the like, and includes a power generation amount measurement unit 51, an integrated control unit 52 as an example of a power control unit, a high efficiency range information storage unit 53 as an example of an efficiency range information storage unit, and a power generation amount storage unit 54. The power generation amount measurement unit 51 and the integrated control unit 52 are configured, for example, as the CPU executes a program stored in the RAM. The high efficiency range information storage unit 53 and the power generation amount storage unit 54 are configured using, for example, the RAM.

The high efficiency range information storage unit 53 stores information indicating a range (a high efficiency range: a first efficiency range) where an engine efficiency (energy conversion efficiency to kinetic energy) in engine characteristics of the engine 10 becomes high. For example, the high efficiency range a high efficiency range HE (a range surrounded by a broken line EL in FIG. 3) in an engine characteristic diagram between an engine rotational speed and a torque illustrated in FIG. 3. In the present embodiment, the information indicating the high efficiency range may be information storing data, which indicates whether a range is the high efficiency range HE, for each position of a map corresponding to an engine rotational speed and a torque, or may be information of a numerical formula that determines whether a range is the high efficiency range HE based on the engine rotational speed and the torque. Incidentally, a method of determining the high efficiency range will be described later. In addition, a range other than the high efficiency range, that is, a range where the engine efficiency becomes low is referred to as a low efficiency range (a second efficiency range) in the present embodiment.

The power generation amount storage unit 54 classifies and stores a power generation amount charged by the motor 30 in accordance with a state at the time of power generation. In the present embodiment, the power generation amount storage unit 54 classifies the power generation amount charged by the motor 30 into a power generation amount (a high efficiency power generation amount: a first efficiency range power generation amount) generated when the engine 10 operates in the high efficiency range, a power generation amount (a low efficiency power generation amount: a second efficiency range power generation amount) generated when the engine 10 operates in the efficiency range, and a power generation amount (a regenerative power generation amount) generated as regenerative energy by the driving force of the drive wheels 19 and 20 in a state where the engine 10 is stopped, and stores the classified result.

While power is generated by the motor 30 (when the SOC increases in the battery 40), the power generation amount measurement unit 51 adds the power generation amount at that time (for example, an increase amount of the SOC) to the high efficiency power generation amount of the power generation amount storage unit 54, in a case where the engine 10 operates in the high efficiency range; adds the power generation amount at that time to the low efficiency power generation amount of the power generation amount storage unit 54, in a case where the engine 10 operates in the low efficiency range other than the high efficiency range; and adds the power generation amount at that time to the regenerative power generation amount of the power generation amount storage unit 54, in a case where the engine 10 is stopped.

In addition, while power is supplied (when the SOC of the battery 40 decreases), the power generation amount measurement unit 51 subtracts the amount of used power from the low efficiency generation amount until the efficiency generation amount reduces to zero, subtracts the amount of used power from the high efficiency power generation amount until the high efficiency power generation amount reduces to zero in a case where the low efficiency power generation amount is zero, and subtracts the amount of used power from the regenerative power generation amount in a case where the low efficiency power generation amount and the high efficiency power generation amount are zero.

The integrated control unit 52 controls the operations of the engine 10 and the motor 30 in an integrated manner. The integrated control unit 52 performs control to supply the power of the low efficiency range power generation amount to the motor 30 when it is necessary to drive the motor 30 (when it is necessary to supply power for driving the motor 30), for example, when it is necessary to cause the hybrid vehicle 1 to travel only by the motor 30, or when predetermined or greater acceleration is required. Incidentally, the integrated control unit 52 stops supplying power to the motor 30 when the SOC of the battery 40 reaches a minimum limit value SOC limit amount: a minimum required amount) of the battery 40 even if the low efficiency range power generation amount is not zero. Here, the SOC limit amount is the amount of SOC determined in consideration of, for example, a variation amount of a power amount caused by deterioration of the battery 40 and a power amount necessary for the operation of the hybrid vehicle 1.

Specific control of the integrated control unit 52 will be described later.

Next, the method of determining the high efficiency range will be described.

Figure 3:
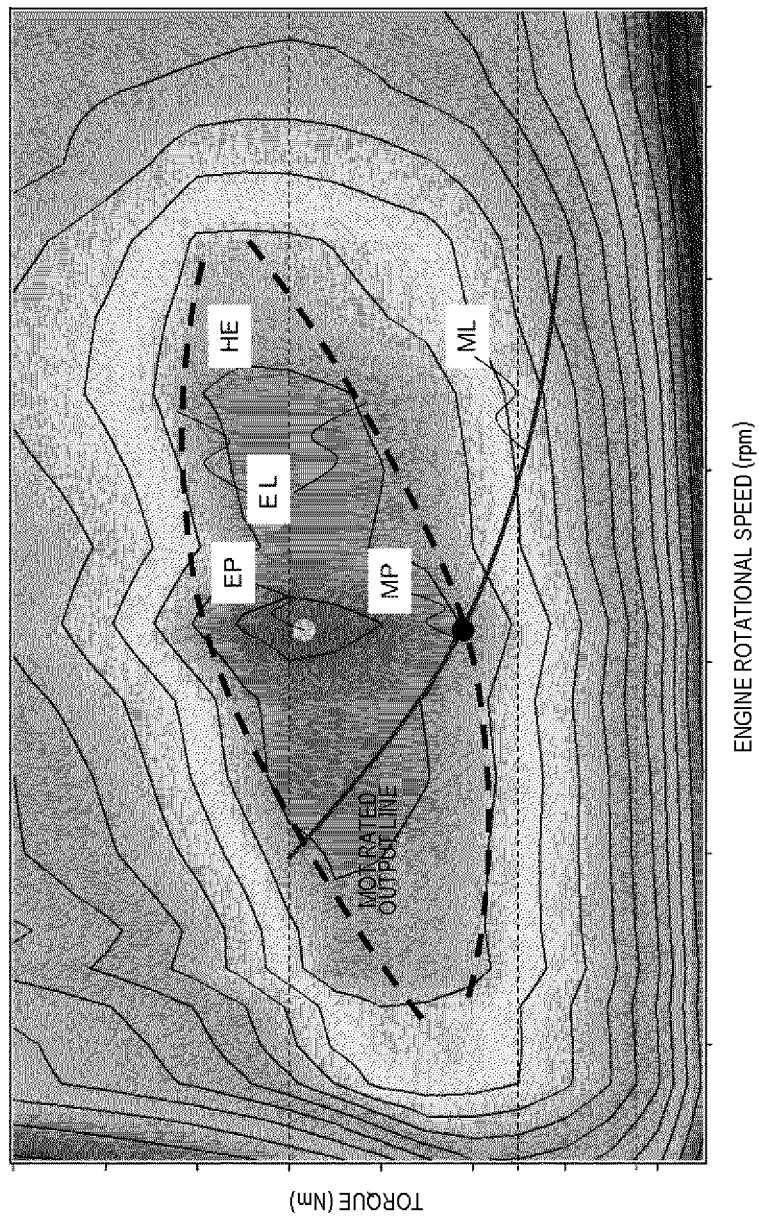
FIG. 3 is a view for describing a method of determining a high efficiency range according to the embodiment.

FIG. 3 is a view for describing the method of determining the high efficiency range according to the embodiment.

First, an engine characteristic representing the engine efficiency corresponding to the engine rotational speed and the output torque in the engine 10 is specified as illustrated in FIG. 3. This engine characteristic can be specified by actually performing measurement using the engine 10 or an engine having the same configuration as the engine 10. In addition, a MOT rated output line ML indicating a relationship between the rotational speed generated by the motor 30 and a rated output torque is specified. The MOT rated output line ML can be specified by actually performing measurement using the motor 30 or a motor having the same structure as the motor 30.

Next, a point EP (a highest efficiency point) where the engine efficiency is the highest is specified based on the engine characteristics.

Next, the rated torque of the motor 30 at the engine rotational speed at the highest efficiency point EP is specified based on the MOT rated output line ML. Next, an engine efficiency MP corresponding to the specified rated torque of the motor 30 is specified based on the engine characteristics.

Next, the high efficiency range HE is determined based on the specified engine efficiency MP. Here, the high efficiency range HE may be set strictly as a range of the engine efficiency MP or higher, that is, a range where the efficiency is high with respect to an engine iso-efficiency line of the engine efficiency MP, or may be set as a range including the efficiency near the engine efficiency MP. When the high efficiency range HE is the range including the efficiency near the engine efficiency MP, a boundary line EL of the high efficiency range HE may have a simple shape (a straight line, a curve protruding to one side, or the like). When the boundary line EL has the simple shape, information to specify the high efficiency range HE can be made as a simple calculation formula.

In the present embodiment, the information to specify the high efficiency range HE determined in this manner stored in the high efficiency range information storage unit 53.

Next, various processes to be executed with the HCM 50 of the hybrid vehicle 1, as the center, according to the embodiment will be described in detail.

First, a power generation amount measurement process will be described.

Figure 4:
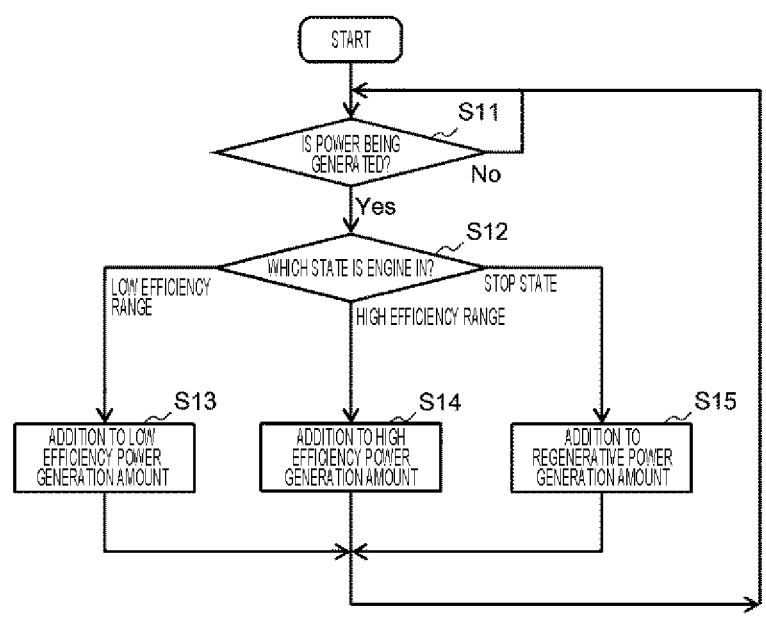
FIG. 4 is a flowchart of a power generation amount measurement process according to the embodiment.

FIG. 4 is a flowchart of the power generation amount measurement process according to the embodiment.

The power generation amount measurement unit 51 determines whether the motor 30 is in the middle of generating power (Step S11).

As a result, when the motor 30 is in the middle of generating power (Step S11: Yes), the power generation amount measurement unit 51 determines an operation state of the engine 10 (Step S12). Specifically, the power generation amount measurement unit 51 determines whether the operation state of the engine 10 is in the low efficiency range or the high efficiency range, or whether the engine 10 is in a stop state based on the torque and engine rotational speed input to the HCM 50 and the information in the high efficiency range information storage unit 53.

As a result, when the state of the engine 10 is in the low efficiency range (Step S12: the efficiency range), the power generation amount measurement unit 51 adds the amount of power generated by the motor 30 at the time to the low efficiency power generation amount of the power generation amount storage unit 54 (Step S13), and causes the process to proceed to Step S11.

In addition, when the state of the engine 10 is in the high efficiency range (Step S12: the high efficiency range), the power generation amount measurement unit 51 adds the amount of power generated by the motor 30 at the time to the high efficiency power generation amount of the power generation amount storage unit 54 (Step S14), and causes the process to proceed to Step S11.

In addition, when the state of the engine 10 is in the stop state (Step S12: the stop state), the power generation amount measurement unit 51 adds the amount of power generated y the motor 30 at the time to the regenerative power generation amount of the power generation amount storage unit 54 (Step S15), and causes the process to proceed to Step S11.

According to the power generation amount measurement process, the amount of power generated in the low efficiency state, the amount of power generated in the high efficiency state, and the amount of power generated by regeneration can be distinguishably grasped regarding the amount of power stored in battery 40.

Next, a hybrid control process will be described.

Figure 5:
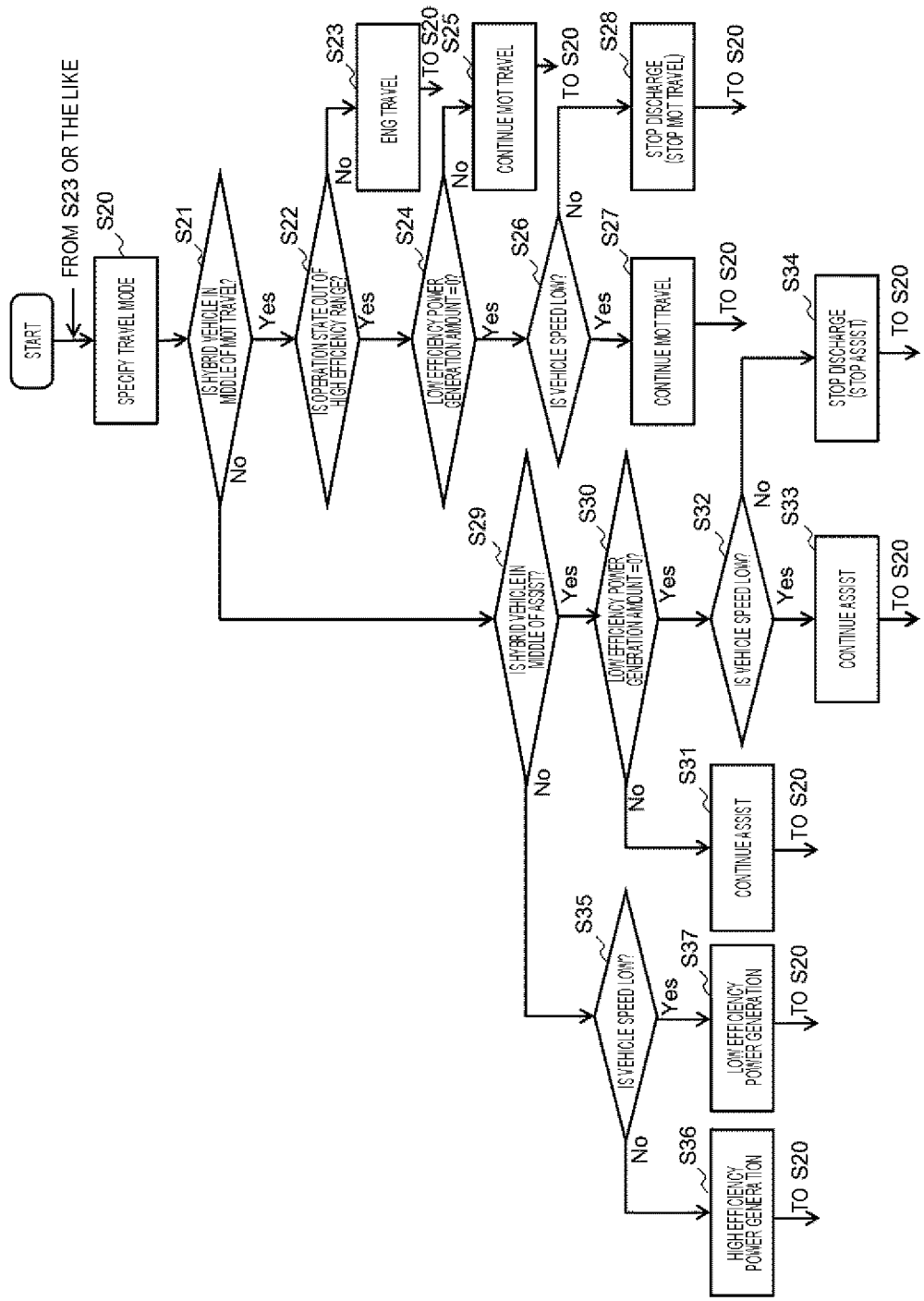
FIG. 5 is a flowchart of a hybrid control process according to the embodiment.

FIG. 5 is a flowchart of the hybrid control process according to the embodiment.

The integrated control unit 52 identifies a travel mode of the hybrid vehicle 1 (Step S20).

Here, for example, the travel mode includes a motor travel (MOT travel) mode in which travel is performed only using the motor 30 and an engine travel (ENG travel) mode in which travel is performed using the engine 10, and the engine travel mode includes an assisted mode in which travel is performed with an assist of the driving force of the motor 30 as and an unassisted mode in which travel is performed without an assist of the driving force of the motor 30. The travel mode can be identified based on a vehicle speed, an accelerator opening degree, the SOC of the battery 40, and the like which are input from various sensors and the like.

Next, the integrated control unit 52 determines whether the travel mode of the hybrid vehicle 1 is the motor travel mode (Step S21). As a result, the integrated control unit 52 causes the process to proceed to Step S22 when the travel mode is the motor travel mode (Step S21: Yes), and causes the process to proceed to Step S29 when the travel mode is not the motor travel mode (Step S21: No), that is, when the travel mode is the engine travel mode.

In Step S22, the integrated control unit 52 determines whether the operation state of the engine 10 (here, the operation state assumed when the engine 10 has been operated) is out of the high efficiency range HE (that is, within the low efficiency range). When the operation state of the engine 10 is not out of the high efficiency range (Step S22: No), that is, when the operation state of the engine 10 is in the high efficiency range, the efficiency of the engine 10 in such a state is favorable, and the efficiency of charge by the motor 30 using the driving force of the engine 10 is favorable (the fuel efficiency is favorable), and thus, the integrated control unit 52 controls the travel mode to be changed to the engine travel mode (Step S23), and causes the process to proceed to Step S20. Specifically, the integrated control unit 52 controls the MCU 43 to start power generation using the motor 30, and controls the ECU 44 to operate the engine 10.

On the other hand, when the operation state of the engine 10 is out of the high efficiency range (Step S22: Yes), the integrated control unit 52 determines whether the low efficiency power generation amount is zero (Step S24).

As a result, when the low efficiency power generation amount is not zero (Step S24: No), there is still excess power in the low efficiency power generation amount, and thus, the integrated control unit 52 continues the motor travel mode (Step S25) and causes the process to proceed to Step S20.

On the other hand, when the low efficiency power generation amount is zero (Step S24: Yes), the integrated control unit 52 determines whether the vehicle speed of the hybrid vehicle 1 is low (Step S26).

As a result, when the vehicle speed of the hybrid vehicle 1 is low (step S26: Yes), the integrated control unit 52 continues the motor travel mode until the high efficiency power generation amount reduces to zero (Step S27) in order to perform travel using the motor 30 until the speed becomes high, and causes the process to proceed to Step S20. On the other hand, when the vehicle speed of the hybrid vehicle 1 is not low (Step S26: No), the integrated control unit 52 controls the MCU 43 so as to stop the power supply (discharge) to the motor 30, stops the motor travel mode, and controls and the ECU 44 to operate the engine 10 (Step S28), and causes the process to proceed to Step S20.

In Step S29, the integrated control unit 52 determines whether the engine travel mode is the assisted mode. As a result, in the case of the assisted mode (Step S29: Yes), the integrated control unit 52 determines whether the low efficiency power generation amount is zero (Step S30).

As a result, when the low efficiency power generation amount is not zero (Step S30: No), there is still excess power in the low efficiency power generation amount, and thus, the integrated control unit 52 continues the assisted mode (Step S31) and causes the process to proceed to Step S20.

On the other hand, when the low efficiency power generation amount is zero (Step S30: Yes), the integrated control unit 52 determines whether the vehicle speed of the hybrid vehicle 1 is low (Step S32). Incidentally, a reference speed for the low vehicle speed used herein may be, for example, a speed higher than a reference speed for the low vehicle speed used in Step S26.

As a result, when the vehicle speed of the hybrid vehicle 1 is low (step S32: Yes), the integrated control unit 52 continues the assisted mode until the high efficiency power generation amount reduces to zero (Step S33) in order to perform the assist using the motor 30 until the speed becomes high, and causes the process to proceed to Step S20. On the other hand, when the vehicle speed of the hybrid vehicle 1 is not low (Step S32: No), the integrated control unit 52 controls the MCU 43 so as to stop the power supply (discharge) to the motor 30, stops the assisted mode (Step S34), and causes the process to proceed to Step S20.

Meanwhile, when it is determined in Step S29 that it is not the assisted mode (Step S29: No), the integrated control unit 52 determines whether the vehicle speed of the hybrid vehicle 1 is low (Step S35). Incidentally, a reference speed for the low vehicle speed used herein may be, for example, a speed higher than a reference speed for the low vehicle speed used in Step S32.

As a result, when the vehicle speed of the hybrid vehicle 1 is not low (Step S35: No), the integrated control unit 52 controls the MCU 43 so as to generate power using the motor 30, such that power is generated while the engine 10 operates at the high efficiency (Step S36), and causes the process to proceed to Step S20. On the other hand, when the vehicle speed of the hybrid vehicle 1 is low (Step S35: Yes), the integrated control unit 52 controls the MCU 43 so as to generate power using the motor 30, such that power is generated while the engine 10 operates at the low efficiency (Step S37), and causes the process to proceed to Step S20.

According to the above-described hybrid control process, power of the low efficiency power generation amount can be used for the motor travel and the assist using the motor 30, and it is possible to increase a travel distance of the motor travel and to improve the acceleration performance or the like of the hybrid vehicle 1. In addition, when the power of the low efficiency power generation amount is used in this manner, the battery 40 has a free capacity that can store the amount of power corresponding to the used low efficiency power generation amount, and thus, the regenerative energy can be stored appropriately in the free capacity.

Next, an example of the travel state of the hybrid vehicle will be described.

Figure 6:
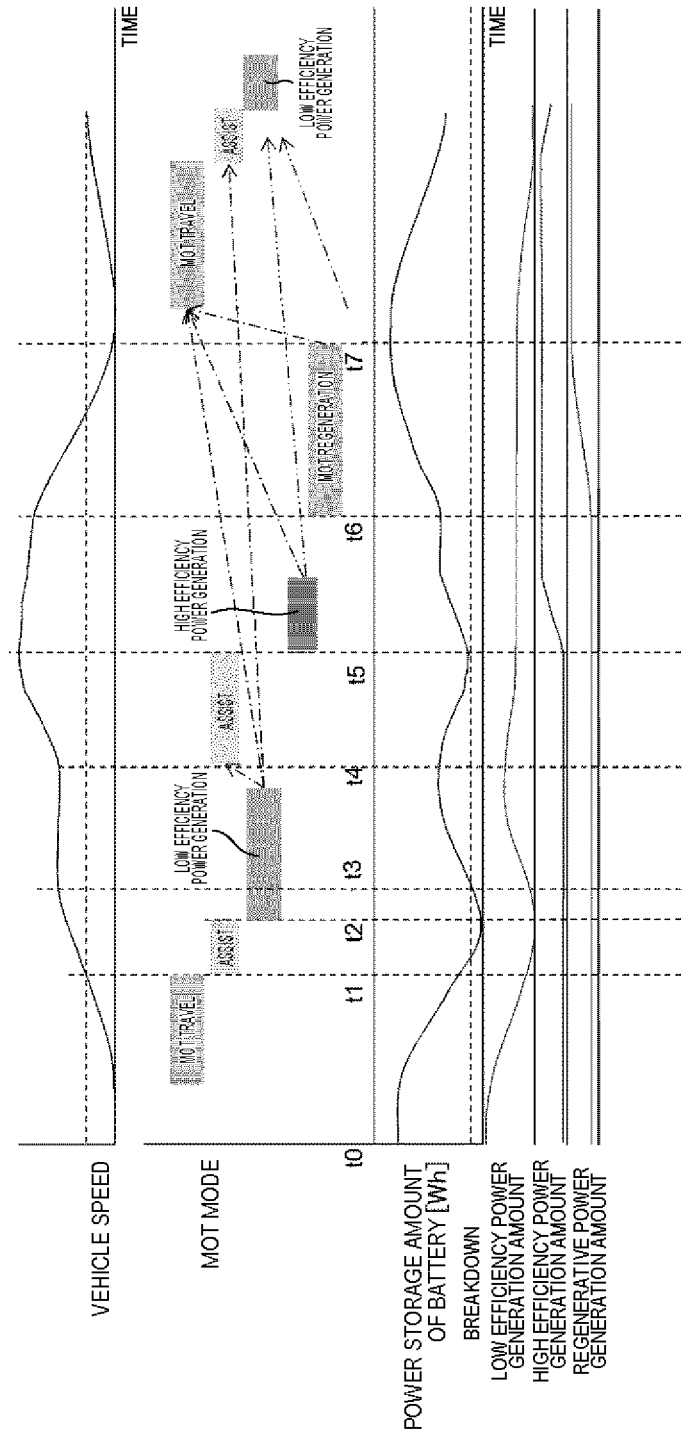
FIG. 6 is a view for describing an example of a travel state of the hybrid vehicle according to the embodiment.

FIG. 6 is a view for describing an example of the travel state of the hybrid vehicle according to the embodiment.

When travel of the hybrid vehicle 1 starts at time to, the integrated control unit 52 causes the hybrid vehicle 1 to travel only using the driving force of the motor 30 as the motor travel mode. As a result, power is supplied from the battery 40 to the motor 30, and the power storage amount of the battery 40 gradually decreases. At this time, the used power is subtracted from the low efficiency power generation amount.

Then, when the vehicle speed of the hybrid vehicle 1 reaches a predetermined speed (a reference speed to end the motor travel mode) at time t1, the integrated control unit 52 switches to the engine travel (assisted) mode to start up the engine 10 and continues the supply of power to the motor 30.

Then, when the low efficiency power generation amount reduces to zero at time t2, the integrated control unit 52 switches to the engine travel (unassisted) mode and stops the supply of power from the battery 40 to the motor 30. Thereafter, the integrated control unit 52 generates power using the motor 30 and stores the power in the battery 40. The power generated by the motor 30 during this process is added as a low efficiency power generation amount since the state of the engine 10 is operating in the low efficiency range. The low efficiency power generation amount is supplied to the motor 30 later at the time of performing the assist using the motor 30, at the time of performing the motor travel, or the like.

Thereafter, when operated by a driver to accelerate the hybrid vehicle 1 (for example, when the accelerator opening degree is increased) at time t4, the integrated control unit 52 switches to the engine travel (assisted) mode, starts the power supply to the motor 30, and executes the assist using the motor 30. Incidentally, at this time, the used power is subtracted from the low efficiency power generation amount.

For example, when operated by the driver to stop the acceleration of the hybrid vehicle 1 (for example, when the accelerator opening degree is decreased) at time t5, the integrated control unit 52 switches to the engine travel (unassisted) mode, and stops the power supply from the battery 40 to the motor 30. At this time, the state of the engine 10 is operating in the high efficiency range, and thus, the integrated control unit 52 generates power using the motor 30 and stores the power in the battery 40. The power generated by the motor 30 during this process is added as a high efficiency power generation amount.

Thereafter, when operated by the driver to decelerate the hybrid vehicle 1 (for example, when the accelerator opening degree is further decreased or a brake pedal is depressed) at time t6, the integrated control unit 52 switches to the regeneration mode, causes the ECU 44 to stop the engine 10 and to disconnect the clutch 12, and controls the MCU 43 to cause the motor 30 to generate power using the driving force from the drive wheels 19 and 20. As a result, kinetic energy of the hybrid vehicle 1 (the driving force generated by the drive wheels 19 and 20) is recovered as regenerative energy, and the vehicle speed of the hybrid vehicle 1 decreases and reduces to zero at time t7. During this process, the power generated by the motor 30 is stored in the battery 40. The power generated by the motor 30 during this process is added as a regenerative power generation amount.

Thereafter, when the hybrid vehicle 1 increases the speed to resume travel, the integrated control unit 52 causes the hybrid vehicle 1 to travel only with the driving force of the motor 30 as the motor travel mode.

Since the power of the low efficiency power generation amount is used for the motor travel (time t0 to t1) and the assist using the motor 30 (time t1 to t2, and time t4 to t5) in the hybrid vehicle 1 according to the present embodiment as described above, a free capacity to store regenerative energy can be effectively ensured in the battery 40. In addition, since power is generated by the motor 30 when the engine 10 is in the state of operating in the high efficiency range (from time t5) while using the power of the low efficiency power generation amount, the power can be stored in the battery 40 with a high efficiency, and the improvement in fuel efficiency can be realized.

Next, examples of the travel state of the hybrid vehicle in a plurality of cases will be described.

Figure 7:
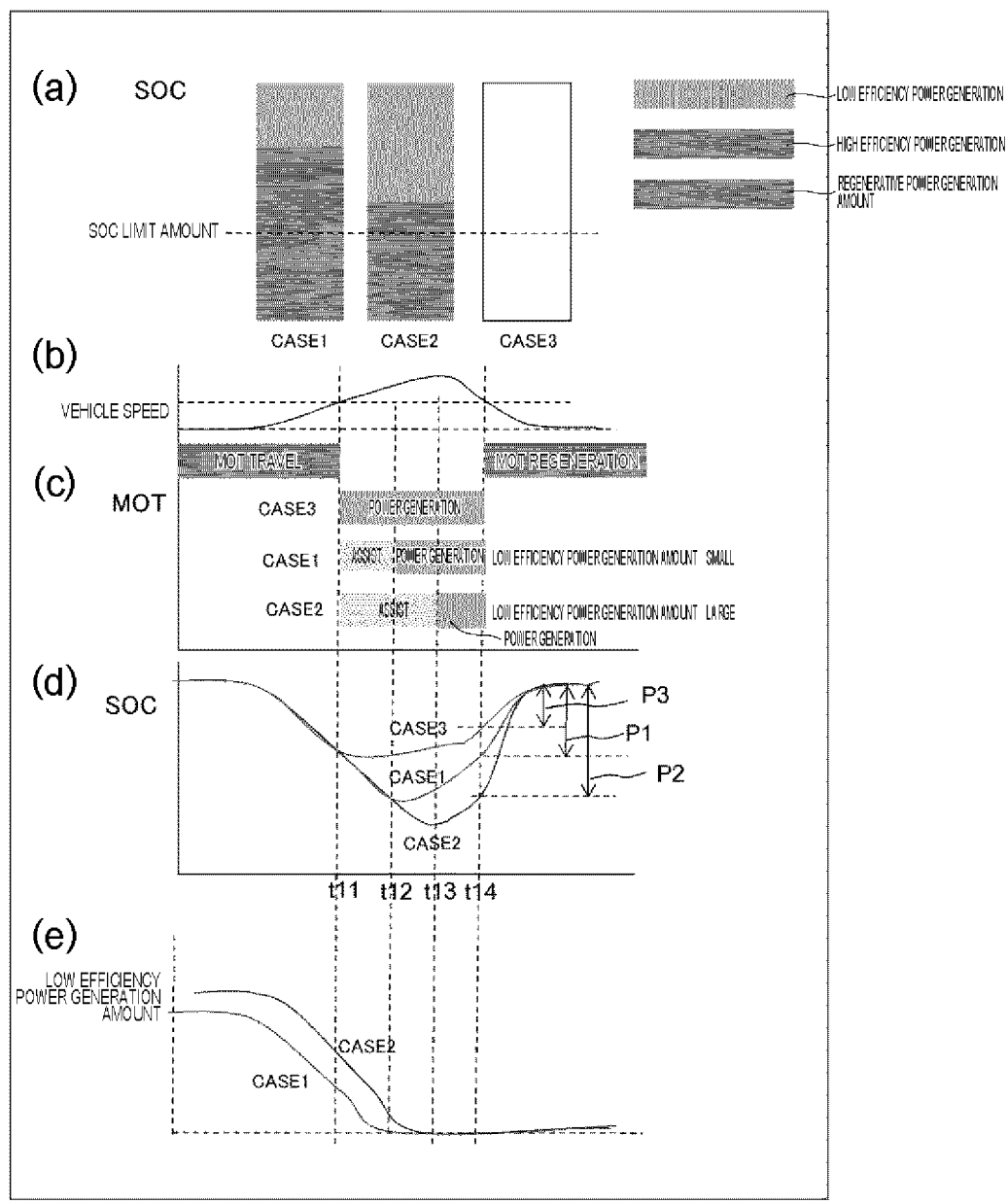
FIG. 7 is a view for describing examples of the travel state of the hybrid vehicle in a plurality of cases according to the embodiment.

FIG. 7 is a view for describing the examples of the travel state of the hybrid vehicle in the plurality of cases according to one embodiment. FIG. 7(a) illustrates an initial SOC state for each of a case (CASE 1) where a low efficiency power generation amount is small, a case (CASE 2) where a low efficiency power generation amount is large, and a case (CASE 3) where a low efficiency power generation amount is not managed as in the present embodiment although the SOC of the battery 40 is the same. FIG. 7(b) illustrates changes in vehicle speed. FIG. 7(c) illustrates operation states of a motor during travel of a vehicle in CASE 1 to 3. FIG. 7(d) illustrates changes in SOC during travel of the vehicle in CASE 1 to CASE 3. FIG. 7(e) illustrates changes in low efficiency power generation amount in CASE 1 and CASE 2.

In CASE 1, a regenerative power generation amount of the SOC of the battery 40 exceeds an SOC limit amount as illustrated in FIG. 7(a). In CASE 2, a regenerative power generation amount does not exceed the SOC limit amount of the SOC of the battery 40. The low efficiency power generation amount of CASE 2 is larger than the low efficiency power generation amount of CASE 1. In CASE 3, the SOC of the battery 40 is not managed in the state of being classified into a low efficiency power generation amount, a high efficiency power generation amount, and a regenerative power generation amount.

In CASE 1, as illustrated in FIG. 7(c), the assist using the motor 30 is performed from time t11 when the motor travel of the hybrid vehicle 1 has ended to time t12 when the low efficiency power generation amount reduces to zero as illustrated in FIG. 7(e), and power is generated by the motor 30 from time t12 to time t14. Then, regeneration is performed by the motor 30 from time t14. With this regeneration, the SOC of the battery 40 can be improved by a power amount P1 as illustrated in FIG. 7(d).

In CASE 2, as illustrated in FIG. 7(c), the assist using the motor 30 is performed from time t11 when the motor travel of the hybrid vehicle 1 has ended to time t13 when the low efficiency power generation amount reduces to zero as illustrated in FIG. 7(e), and power is generated by the motor 30 from time t13 to time t14. Then, regeneration is performed by the motor 30 from time t14. With this regeneration, the SOC of the battery 40 can be increased by a power amount P2 as illustrated in FIG. 7(d).

In CASE 3, as illustrated in FIG. 7(c), power is generated by the motor 30 from time t11 when the motor travel of the hybrid vehicle 1 has ended to time t14. Then, regeneration is performed by the motor 30 from time t14. With this regeneration, the SOC of the battery 40 can be increased by a power amount P3 as illustrated in FIG. 7(d).

Since the low efficiency power generation amount is larger in CASE 2 than in CASE 1, an assist-possible time is longer as illustrated in FIG. 7(c), and as a result, it is possible to improve the acceleration performance of the hybrid vehicle 1 in the meantime.

In addition, it possible to recover a larger amount of power in CASE 1 and CASE 2 than in CASE 3 as illustrated in FIG. 7(d). In addition, a larger amount of power can be recovered in CASE 2 than in CASE 1.

Next, an HCM of a hybrid vehicle according to a modification will be described. Incidentally, a configuration of the hybrid vehicle according to the modification is the same as that of the hybrid vehicle according to the above-described embodiment, and thus, will be described using the drawings, the reference signs, and the like which have been used for the description of the above-described embodiment, for the convenience.

The HCM 50 according to the modification is different from the HCM 50 according to the embodiment described above in terms of control of power generation using the motor 30. Hereinafter, the HCM 50 according to the modification will be described focusing on differences.

Figure 8:
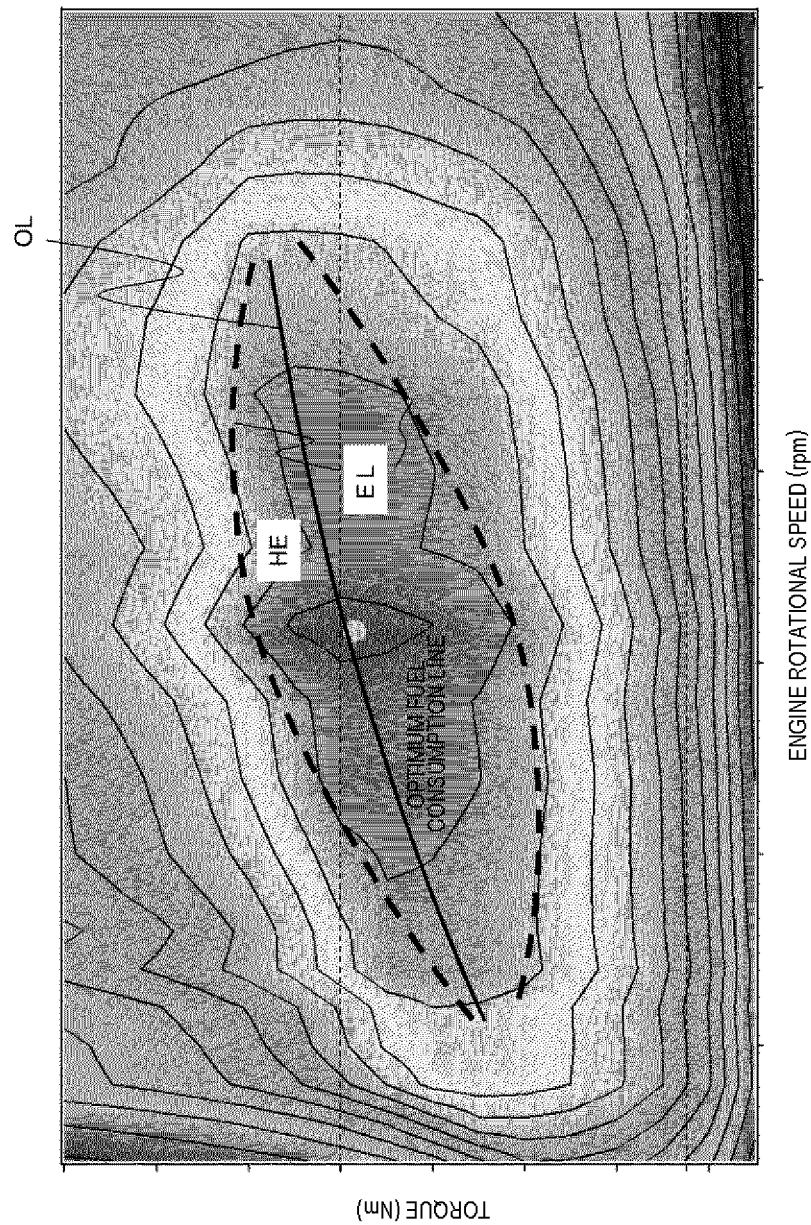
FIG. 8 is a view for describing power generation control according to a modification.

FIG. 8 is a view for describing power generation control according to the modification.

When an SOC the battery 40 is larger than a predetermined first threshold, the integrated control unit of the HCM 50 controls the MCU 43 to execute power generation using the motor 30 only when an operation state of the engine 10 is on or near an optimum fuel efficiency line OL illustrated in FIG. 8, and does not execute the power generation using the motor 30 in the other operation states Therefore, power can be efficiently stored in the battery 40 while maintaining the fuel efficiency at an optimum amount.

In addition, when the SOC of the battery 40 is equal to or lower than the predetermined first threshold and equal to or higher than a second threshold, the integrated control unit 52 controls the MCU 43 to execute power generation using the motor 30 only when the operation state of the engine 10 is in the high efficiency range HE, and does not execute the power generation using the motor 30 in the other operation states. Therefore, it is possible to promote the storage of power in the battery 40 while maintaining the fuel efficiency relatively high.

In addition, when the SOC of the battery 40 is lower than the predetermined second threshold, the integrated control unit 52 controls the MCU 43 to execute power generation using the motor 30 when the operation state of the engine 10 is not only in the high efficiency range HE but also in a low efficiency range other than the high efficiency range HE. Therefore, it is possible to promote the storage of power in the battery 40.

Incidentally, the present invention is not limited to the above-described embodiment and modification, and can be appropriately modified and implemented within a range not departing from a spirit of the present invention.

For example, as an operation of the integrated control unit 52 in the case where it is necessary to drive the motor 30 in the above embodiment, the power of the battery 40 may be supplied to the motor 30 until the low efficiency power generation amount reduces to zero when the vehicle speed is lower than a first speed set value, the power of the battery 40 may be supplied to the motor 30 until the high efficiency power generation amount reduces to zero when the low efficiency power generation amount is zero and the vehicle speed is equal to or lower than a second set speed (the second set speed<the first set speed), and the power of the battery 40 may be supplied to the motor 30 until the SOC of the battery 40 reaches the SOC limit value when the low efficiency power generation amount and the high efficiency power generation amount are zero and the vehicle speed is lower than a third set speed (the third set speed<the second set speed). In this manner, the high efficiency power generation amount can be used to increase the vehicle speed when the low efficiency power generation amount is insufficient.

In addition, although the mode is switched to the engine drive mode immediately when an assumed operation state of the engine 10 is in the high efficiency range during the motor travel in the above embodiment as illustrated in Step S22, the present invention is not limited thereto. Even if the assumed operation state of the engine 10 is in the high efficiency range, the motor travel mode may be maintained until the low efficiency power generation amount reduces to zero.

In addition, the clutch 12 is used as a power transmission mechanism between the engine 10 and the transmission 14 in the above embodiment, but the present invention is not limited thereto, and a torque converter may be provided as the power transmission mechanism. The point is to provide the power transmission mechanism that can be switched between a state where the driving force is transmitted between the engine 10 and the transmission 14 and a state where the driving force is interrupted or the driving force is reduced.

In addition, some or all of the processes performed by the CPU of the HCM 50 in the above embodiment may be performed by a hardware circuit. In addition, at least one of the power generation amount measurement unit 51, the integrated control unit 52, the high efficiency range information storage unit 53, and the power generation amount storage unit 54, which are provided in the HCM 50, may be provided in other devices (the ECU 44, the TCU 45, the MCU 43, and the like) of the hybrid vehicle 1.

In addition, although the above embodiment is configured such that the output shaft of the engine 10 and the output shaft of the motor 30 are disposed at separated positions and are connected via a gear to allow power transmission, the present invention is not limited thereto. For example, the output shaft of the engine 10 and the output shaft of the motor 30 may be coaxially disposed and connected.

REFERENCE SIGNS LIST

1 hybrid vehicle
10 engine
12 clutch
30 motor
40 battery
50 HCM
51 power generation amount measurement unit
52 integrated control unit
53 high efficiency range information storage unit
54 power generation amount storage unit

The invention claimed is:

1. A hybrid vehicle control apparatus, which includes: an engine; a drive wheel to which a driving force of the engine is transmittable; a motor to which the driving force from the engine is transmittable and which is capable of transmitting a driving force to the drive wheel; and a battery which supplies power for driving the motor and stores power generated by the motor, the hybrid vehicle control apparatus comprising:
    an efficiency range information storage unit that stores information specifying a first efficiency range in which an engine efficiency of the engine is relatively high in an engine characteristic of the engine;
    a power generation amount measurement unit that measures a second efficiency range power generation amount, which is an amount of power generated by the motor and stored in the battery, when the engine operates in a second efficiency range being out of the first efficiency range; and
    a power control unit that controls power of the second efficiency range power generation amount to be supplied from the battery to the motor when it is necessary to supply power for driving the motor.

2. The hybrid vehicle control apparatus according to claim 1, wherein, in a case where it is necessary to supply power for driving the motor, the power control unit performs control to supply power to the motor until
    the power of the second efficiency range power generation amount in the battery is consumed or
    power of the battery reaches a minimum required amount.

3. The hybrid vehicle control apparatus according to claim 1, wherein the case where it is necessary to supply power for driving the motor is a case where
    the hybrid vehicle is driven to travel only by the motor or
    a driving force of the motor is output to assist a driving force of the engine.

4. The hybrid vehicle control apparatus according to claim 1, wherein
    when the engine operates in the first efficiency range, the power generation amount measurement unit measures a first efficiency range power generation amount, which is an amount of power generated by the motor and stored in the battery, and in the case where it is necessary to supply power for driving the motor, the power control unit performs control to supply power of the first efficiency range power generation amount to the motor when the hybrid vehicle is hardly set to a predetermined state even after consumption of the entire power of the second efficiency range power generation amount.

5. The hybrid vehicle control apparatus according to claim 1, wherein the first efficiency range is determined based on an engine iso-efficiency line in the engine characteristic relating to an engine efficiency corresponding to a rotational speed of the engine and an output torque of the engine.

6. The hybrid vehicle control apparatus according to claim 5, wherein the first efficiency range is a range equal to or higher than a predetermined engine efficiency in the engine characteristic.

7. The hybrid vehicle control apparatus according to claim 1, wherein the first efficiency range is determined based on an engine efficiency at an engine torque matching a rated torque of the motor, the rated torque of the motor corresponding to an engine rotational speed at a highest efficiency point which is a point where the engine efficiency is highest, in the engine characteristic relating to the engine efficiency corresponding to the rotational speed of the engine and the output torque of the engine.

8. The hybrid vehicle control apparatus according to claim 1, wherein the hybrid vehicle further includes a power transmission mechanism between the engine and the motor, the power transmission mechanism being capable of transmitting as well as interrupting or reducing a driving force between the engine and the motor, the power control unit causes the power transmission mechanism to be capable of transmitting the driving force between the engine and the motor so as to cause the motor to generate power using the driving force of the engine.

9. The hybrid vehicle control apparatus according to claim 8, wherein the power control unit causes the motor to generate power using the driving force of the engine when the engine operates within the first efficiency range.

10. A hybrid vehicle comprising: an engine; a drive wheel to which a driving force of the engine is transmittable; a motor to which the driving force from the engine is transmittable and which is capable of transmitting a driving force to the drive wheel; a battery which supplies power for driving the motor and stores power generated by the motor; and a control apparatus, wherein the control apparatus includes:

an efficiency range information storage unit that stores information specifying a first efficiency range in which an engine efficiency of the engine is relatively high in an engine characteristic of the engine;

a power generation amount measurement unit that measures a second efficiency range power generation amount, which is an amount of power generated by the motor and stored in the battery, when the engine operates in a second efficiency range being out of the first efficiency range; and a power control unit that controls power of the second efficiency range power generation amount to be supplied from the battery to the motor when it is necessary to supply power for driving the motor.

* * * * *